(12) United States Patent
Duan et al.

(10) Patent No.: US 9,747,610 B2
(45) Date of Patent: Aug. 29, 2017

(54) METHOD AND APPARATUS FOR DETERMINING PRESENCE

(71) Applicant: AT&T Intellectual Property I, LP, Atlanta, GA (US)

(72) Inventors: Rong Duan, Summit, NJ (US); Guang-Qin Ma, Kendall Park, NJ (US); Olivia Hong, Bridgewater, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 374 days.

(21) Appl. No.: 14/087,199

(22) Filed: Nov. 22, 2013

(65) Prior Publication Data

US 2015/0149245 A1    May 28, 2015

(51) Int. Cl.
  *G06Q 10/00*    (2012.01)
  *G06Q 30/00*    (2012.01)
  *G06Q 30/02*    (2012.01)

(52) U.S. Cl.
  CPC .............................. *G06Q 30/0202* (2013.01)

(58) Field of Classification Search
  USPC ...................................................... 705/7.31
  See application file for complete search history.

(56) References Cited

U.S. PATENT DOCUMENTS

| | | | |
|---|---|---|---|
| 7,924,149 B2 | 4/2011 | Mendelson | |
| 8,311,510 B2 | 11/2012 | Cradick | |
| 8,326,465 B2 | 12/2012 | Rosca et al. | |
| 8,346,688 B2 | 1/2013 | Carroll et al. | |
| 8,386,082 B2 | 2/2013 | Oswald | |
| 8,428,918 B2* | 4/2013 | Atrazhev | G06K 9/00778 382/103 |
| 8,442,807 B2 | 5/2013 | Ramachandran | |
| 8,457,796 B2 | 6/2013 | Thind | |

(Continued)

FOREIGN PATENT DOCUMENTS

WO    2013110815 A1    8/2013

OTHER PUBLICATIONS

Melfi, Ryan et al., "Measuring building occupancy using existing network infrastructure." Green Computing Conference and Workshops (IGCC), 2011, International. IEEE, 2011.

(Continued)

*Primary Examiner* — Alan S Miller
*Assistant Examiner* — Folashade Anderson
(74) *Attorney, Agent, or Firm* — Guntin & Gust, PLC; Atanu Das

(57) ABSTRACT

A system that incorporates teachings of the present disclosure may include, for example, determining a first linear model and a first log-linear model according to first explanatory variables and a first plurality of occupancy estimates, determining a second linear model and a second log-linear model according to second explanatory variables and a second plurality of occupancy estimates, evaluating, according to a location of a building, the first linear model, the first log-linear model, the second linear model, and the second log-linear model according to first values of the first explanatory variables and second values of the second explanatory variables, and combining results from the evaluating to generate a mixed occupancy estimate. Other embodiments are disclosed.

20 Claims, 5 Drawing Sheets

(56) References Cited

U.S. PATENT DOCUMENTS

| | | | |
|---|---|---|---|
| 8,484,077 B2 * | 7/2013 | Cetin | G06Q 10/04 |
| | | | 705/14.1 |
| 8,510,255 B2 | 8/2013 | Fadell et al. | |
| 8,510,256 B2 | 8/2013 | Cho et al. | |
| 8,521,659 B2 | 8/2013 | Livingston et al. | |
| 8,661,104 B2 * | 2/2014 | Finkelstein | H04L 41/145 |
| | | | 709/223 |
| 2010/0299116 A1 | 11/2010 | Tomastik et al. | |
| 2011/0213588 A1 | 9/2011 | Lin et al. | |
| 2011/0221624 A1 | 9/2011 | Kavaler | |
| 2012/0021765 A1 * | 1/2012 | Hendriks | H04W 4/02 |
| | | | 455/456.1 |
| 2012/0265506 A1 | 10/2012 | Goldstein et al. | |
| 2013/0162481 A1 * | 6/2013 | Parvizi | G01S 3/023 |
| | | | 342/452 |
| 2013/0181867 A1 * | 7/2013 | Sturdivant | H04W 64/00 |
| | | | 342/368 |
| 2013/0194410 A1 * | 8/2013 | Topman | G06K 9/0014 |
| | | | 348/79 |
| 2013/0226857 A1 | 8/2013 | Shim et al. | |
| 2013/0289952 A1 * | 10/2013 | Marwah | G06Q 10/04 |
| | | | 703/2 |
| 2017/0026987 A1 * | 1/2017 | Velu | H04W 72/1242 |

OTHER PUBLICATIONS

Meyn, Sean et al., "A sensor-utility-network method for estimation of occupancy in buildings." Decision and Control, 2009 held jointly with the 2009 28th Chinese Control Conference. CDC/CCC 2009. Proceedings of the 48th IEEE Conference on. IEEE, 2009.

Pan, Jianli et al., "A framework for smart location-based automated energy controls in a green building testbed." Energytech, 2012 IEEE. IEEE, 2012.

Work, Daniel B. et al., "An ensemble Kalman filtering approach to highway traffic estimation using GPS enabled mobile devices." Decision and Control, 2008. CDC 2008, 47th IEEE Conference on. IEEE, 2008.

* cited by examiner

200

400

METHOD AND APPARATUS FOR DETERMINING PRESENCE

FIELD OF THE DISCLOSURE

The present disclosure relates generally to determining presence and more specifically to a method and apparatus for determining occupancy.

BACKGROUND

Communication systems can provide a range of services for users. To provide robust, effective, and efficient communication services, communication service providers must understand the spectrum and volume of customer demands upon the communications system. To effectively serve customers, the service provide must anticipate customer demands, include properly defining the size and makeup of the customer base.

DETAILED DESCRIPTION

Figure 1:
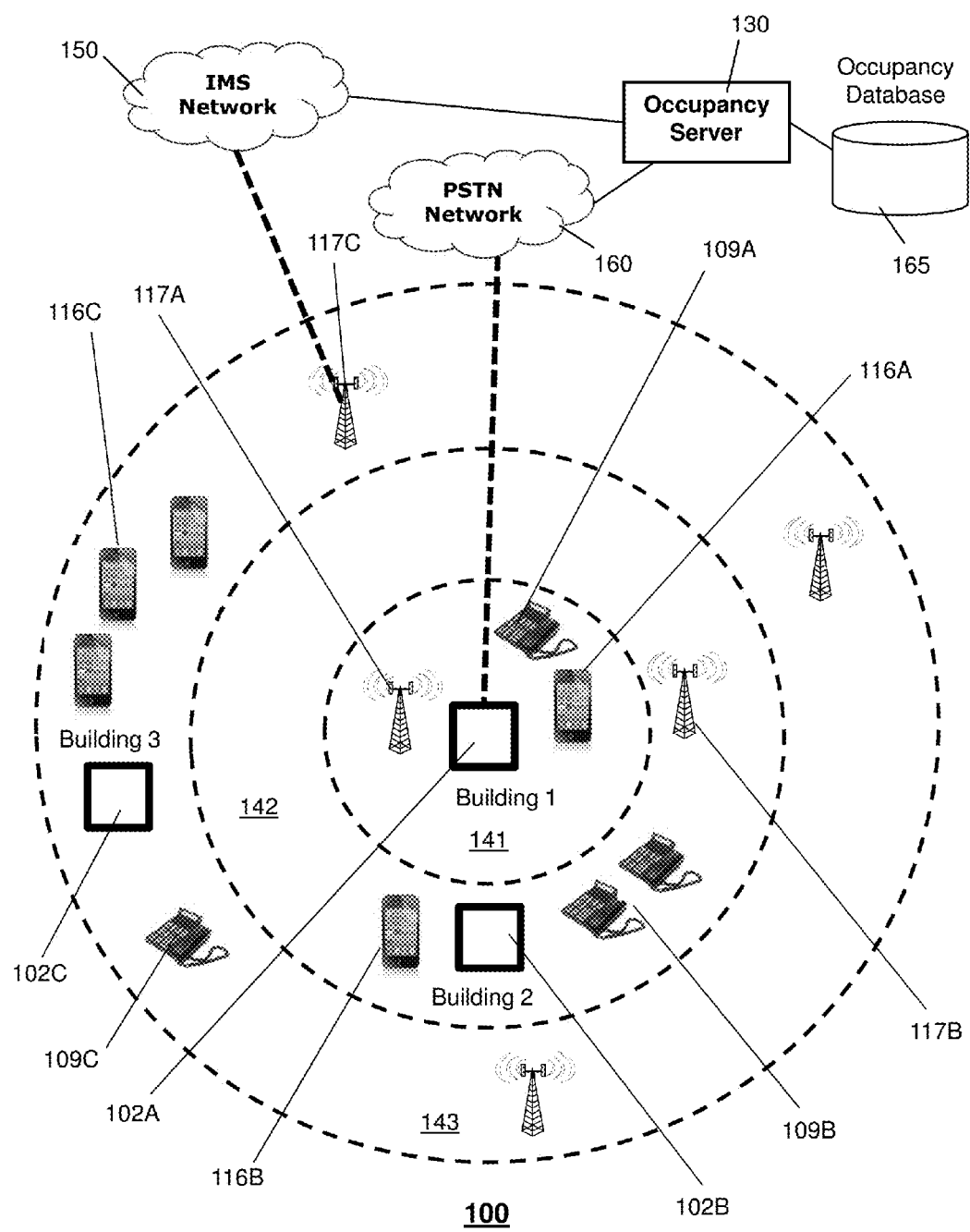
FIG. 1 depicts an illustrative embodiment of a system that provides communication services to multiple building over ranges of locations.

In one or more embodiments, models can be used for accurately estimating the number of people in a building. Accurate occupancy estimates can be used, for example, by telecommunication providers for properly sizing communication infrastructure. For example, building occupancy information can be used to calculate anticipated data usage and transmission requirements. Key infrastructural support services, such as backhaul communication bandwidth and/or indoor metro cell capacity, can be provided for building occupants. Occupancy estimates can be commercially obtained. However these estimates are found to frequently lack reliability because businesses shield occupancy information from outside inspection.

In one or more embodiments, data can be collected from multiple data sources that directly or indirectly relate to building occupancy. Excellent input data quality can be obtained from these sources and can be used to provide a more accurate estimate of building occupancy. A group of data sources can be analyzed to determine which variables correlated to building occupancy using variable selection and cross validation techniques to evaluate input data to output prediction consistency. Models can be developed that use reliable and available data, which indirectly relates to building occupancy, to estimate actual building occupancy.

One embodiment of the present disclosure includes a server having a memory and a processor. The memory has executable instructions and the processor circuit is coupled with the memory. The processor, when executing the executable instructions, can perform operations for receiving a request over a network for an occupancy estimate for a building. The processor can also perform operations for accessing first values of first explanatory variables associated with a location of the building. The first explanatory variables are predictive of first reported occupancy estimates of a first occupancy estimating source. The processor can, in turn, perform operations for evaluating a first occupancy model according to the first values to generate a first occupancy estimate for the building and evaluating a second occupancy model according to the first values to generate a second occupancy estimate for the building. In turn, the processor can perform operations for accessing second values of second explanatory variables associated with the location of the building. The second explanatory variables are predictive of second reported occupancy estimates of a second occupancy estimating source. The processor can also perform operations for evaluating a third occupancy model according to the second values to generate a third occupancy estimate for the building and evaluating a fourth occupancy model according to the second values to generate a fourth occupancy estimate for the building. The processor can also perform operations for statistically combining the first occupancy estimate, the second occupancy estimate, the third occupancy estimate, and the fourth occupancy estimate to generate a mixed occupancy estimate, and, in turn, reporting the mixed occupancy estimate of the network.

One embodiment of the present disclosure is a method including evaluating, by a system comprising a processor, a first linear regression occupancy model according to first values of first explanatory variables associated with a location of a building to generate a first occupancy estimate. The method can further include evaluating, by the system, a second log-linear occupancy model according to the first values to generate a second occupancy estimate. The method can include evaluating, by the system, a third linear regression occupancy model according to second values of second explanatory variables associated with the location of the building to generate a third occupancy estimate. The method can include evaluating, by the system, a fourth log-linear occupancy model according to the second values to generate a fourth occupancy estimate. The method can include statistically combining the first occupancy estimate, the second occupancy estimate, the third occupancy estimate, and the fourth occupancy estimate to generate a mixed occupancy estimate and reporting, by the system, the mixed occupancy estimate over a communication network.

One embodiment of the present disclosure is a machine-readable storage medium, comprising executable instructions that, when executed by a processor, facilitate performance of operations, comprising determining a first linear model and a first log-linear model according to first explanatory variables and a first plurality of occupancy estimates. The instructions can further cause the processor to perform operations for determining a second linear model and a second log-linear model according to second explanatory variables and a second plurality of occupancy estimates. The instructions can, in turn, cause the processor to perform operations for evaluating, according to a location of a building, the first linear model, the first log-linear model, the second linear model, and the second log-linear model according to first values of the first explanatory variables and second values of the second explanatory variables, and, in turn, combining results from the evaluating to generate a mixed occupancy estimate.

FIG. 1 depicts an illustrative embodiment of a system 100 for providing building occupation estimates. The system can represent, in simplified form, a geographic area that includes buildings 102A-C. Each building 102A can have an occupancy, which can be defined in one or more ways. Occupancy can be defined according to the number of people who live at the building 102A, who work at the building 102A, who spend significant time at the building, and/or who use particular services at the building 102A. For example, an occupant could be defined as anyone who spends more than a minimum number of hours at the building 102A for an average day. Another example can be defining an occupant as someone who has an address (home, employment, and/or business) at the building 102A. An occupant can be defined by the time of day that the person is in the building 102A. An occupant can be defined according to activities and/or services that a person accesses through a building 102A. For example, a person who receives medical treatment and/or is admitted to a hospital can be considered an occupant while a visitor to the hospital is not an occupant.

In one or more embodiments, an occupant can be defined according to telecommunication services that are accessed via the building 102A. For example, an occupant can be counted according to access to telecommunication services at the building 102A. Further, if the purpose of the occupancy estimate is to for determining information infrastructure, then the occupant can be counted according to the relative scope or size of services used by the occupant. For example, one occupant can be weighted according to how many services (landline, internet, cellular phone) the person uses via the building 102A.

In one or more embodiments, the system 100 can include infrastructure, facilities, services, and/or equipment for the delivery of telecommunication services to occupants of buildings 102A-C and for people near the location of the buildings 102A-C. For example, telephone and data services can be provided to buildings 102A-C via an IP Multimedia Subsystem (IMS) network 150 and/or a public switched telephone network (PSTN) 160. For example, the IMS network 150 can provide voice and data services to wireless devices, such as mobile phones 116A-C, while the PSTN network 160 can provide voice and data services to wired devices, such as landline telephones 109A-C.

In one or more embodiments, the interconnectivity of the telecommunication systems 150 and 160 to the system 100 can provide visibility locations of communication devices 109A-C and 116A-C with respect to buildings 102A-C. In particular, the locations of wired telephones 109A-C can be determined according to locations of switching stations and/or locations of buildings to which the wired telephones 109A-C are assigned. The locations of mobile devices 116A-C can be determined from global positioning satellite (GPS) receivers at the mobile devices 116A-C and/or by determining which local cell towers that are serving the mobile devices 116A-C. For example, locations of mobile devices 116A-C can be determined by triangulating signal strengths for signals between the devices and the cell towers 117A-C. Whereas landline telephones 109A-c exhibit fixed locations, the locations of mobile devices 116A-C are, by nature, variable. However, typical locations for the mobile devices 116A-C and/or average densities of mobile devices 116A-C operating at various locations can be determined. In another embodiment, locations of local cell towers 117A-C can be determined.

In one or more embodiments, the system 100 can provide for all or a portion of computing devices 130 to function as an occupancy server 130 (herein referred to as server 130). The server 130 can use common computing and communication technology to perform function 162, which can include among things, receiving data associated with locations of buildings 102A-B, landline telephones 109A-C, mobile devices 116A-C, and/or cellular towers 117A-C. The server 130 can use the information to determine estimates for occupancy at one or more buildings 102A-C.

In one or more embodiments, a server 130 can collect a set of data, which can include the location information for the locations of buildings 102A-B, landline telephones 109A-C, mobile devices 116A-C, and/or cellular towers 117A-C. The set of data can further include information regarding external living units in buildings and information on types of mobile devices. In one or more embodiments, the set of data can include estimated occupancies for buildings 102A-C from one or more estimation services. For example, an occupancy estimation service can provide, for a subscription fee, estimates of building occupancy for a number of buildings in an area. The estimation service can further include its own estimates for landline telephones and/or external living units.

In one or more embodiments, the location information can be categorized with respect to its location relative to any particular building. For example, the set of data can be classified by the server 130 based on relative distances from a building 1 102A. For example, after building 1 102 is selected, a series of areas 141-143 can be defined to include other buildings 102B-C, mobile devices 116A-C, landline telephones 109A-C, cellular towers 117A-C, and other sources of information that could be predictive of occupancy at the selected building 102A. A sum of all mobile devices 116A-C within a first radius 141 from building 1 102A can include, for example, mobile device 116A. A sum of all mobile devices within a second radius 142 from building 1 102A can include mobile devices 116A and 116B. Similarly, summations of potentially relevant data sources can be generated for other variables.

In one or more embodiments, the server 130 can analyze the available data to determine which of the potentially relevant variables is actually predictive of building occupancy. For example, a linear regression analysis can be performed on the available data. In one embodiment, if an estimated building occupancy value is available for this building 102A (from an occupancy estimating source), then this estimate can be used as a guide for an "actual" building occupancy in a linear regression process. In one or more embodiments, the linear regression analysis is performed using input data (sums of mobile devices in radii, etc.) and output data (estimated occupancy) for a group of buildings 102A-C. As a result of the regression analysis, a first linear regression model can be generated and variables that correlate well with building occupancy can be selected as a group of first explanatory variables, while excluding other variables. In one or more embodiments, a first log-linear model can similarly be derived from the first set of explanatory variables. The addition of a log-linear model can eliminate negative predictive values. In one embodiment, the training group data can be selected to constrain the discrepancies between occupancy estimates from the first source and the second source under a threshold, T.

In one or more embodiments, a second linear regression model can be generated using a second occupancy estimate. For example, some buildings 102A-C will have available occupancy estimates from a second source. In some cases, buildings will have occupancy estimates available only from the first source, only from the second source, from neither source, or from both sources. The second linear regression analysis repeats the process using a group of buildings 102A-C that is subject to estimates from a second source. The second analysis will generally result in a second linear regression model that will be directed to second set of explanatory variables. A second log-linear model can also be generated.

In some cases, the first and second linear regressions can result in selecting one or more of the same explanatory variables for us in calculating occupancy estimates. That is, the first and second regressions can determine that a variable, such as the sum of landline telephones at a radius of 400 meters, is strongly correlated to both occupancy estimates from both the first source and the second source. In some cases, the first and second linear regressions can result in identifying sets of explanatory variables that are unique for each group of occupancy estimates.

In one embodiment, where some buildings have occupancy estimates from more than one estimating source, then the estimates can be used to cross-validate one another. That is, some occupancy estimates from a first source of data can be excluded from a regression analysis based on discrepancies with estimates for the same building from a second source of data. Conversely, where the first and second sources appear to a correlate for particular buildings, then this can be taken as good evidence for including this building in the regression analysis.

In one or more embodiments, after the regression analysis is completed, four models of occupancy estimation can be available for use by the server—a first regression model, a first log-linear model, a second regression model, and a second log-linear model. In one or more embodiments, the four models can be used in combination to calculate occupancy estimates for buildings 102A-C. For example, a building 102A may not have been subject to occupancy estimation from any estimating source. Or, an estimate is available, but there is reason to doubt the accuracy of the estimate. In one or more embodiments, the four models can be used to generate an estimated occupancy for the building 102A. This estimate can benefit from the use of data that can be readily available to the server 130. As added benefits, the data can be up-to-date and can consider factors that are not accessible to occupancy estimating sources.

In one or more embodiments, the four models can be evaluated according to the first and second explanatory variables to generate a set of estimated occupancies for the building 102A. In one embodiment, the server 130 can report any or all of these estimates as the occupancy of the building. In one embodiment, the estimates can be combined. For example, the results of the first and second linear regression models can be statistically combined. In another example, the results of the first and second log-linear models can be statistically combined. In yet another example, all four of the results can be statistically combined. In one embodiment, the four estimates can be combined to generate a mixed estimate, Y, using an equation:

$$Y=(Y_1(Y_1>=0)+Y_2(Y_2>=0)+Y_3(Y_1<0)+Y_4(Y_2<0))/2,$$

where $Y_1$ is the first linear model, $Y_2$ is the second linear model, $Y_3$ is the first log-linear model, $Y_2$ is the second log-linear model.

In one or more embodiments, the absolute truth as to building occupancy impossible or very expensive to collect. In one example, a building occupancy estimate can generate and sell estimates for use in commercial ventures. The first source of estimates can collect information as part of business profiling and make this information available to clients. Business owners can be responsible to enter and update the information. However, information regarding occupancy can be associated with certain other important details of a business that may be matters, which the business owner wishes to keep private. Further, the accuracy of this information does not typically impact business credit or other business public relations. As a result, even where business owners may be willing share direct information on occupancy, there is typically a lack of the motivations to update the information in a timely manner. By generating a model of occupancy that is based on explanatory variables that are largely outside of the proprietary control of the business, the model further alleviates concerns from third parties that an individual business or the occupancy estimation source have manipulate the numbers. A comparison of the first estimation source and second estimation source can show that the nationwide totals are very close. However, comparisons of building occupancy estimates at a level of particular Zip Code can show large discrepancies demonstrated by scatter plot analysis (not shown).

It is found that one source of occupancy estimates provides the building occupancy information covering many businesses but includes uneven levels of accuracy. As second source of occupancy estimates is found to provide data for only a limited number of businesses. Alternatives, such as attempting to collect employee working addresses from every business are not practical and cannot be considered as ultimately accurate, especially for large corporate entities. Due to a diversity of business functions, employee types, and flexible of work policies, it is found that using employee working addresses does not yield accurate estimates for building occupancy.

However, with the benefit of modern telecommunications, data collection, and analysis, it is possible to analyze large amounts of available data that can prove relevant in estimating building occupancy. In one or more embodiments, data can collected and analyzed for potentially correlations and predictive capacity with respect to building occupancy. A subset of data can be identified as explanatory variables, where the explanatory variables are consistent with the estimate of the source. For example the first explanatory variables for the first source can be identified as $S_1$, while the second explanatory variables for the second source can be identified as $S_2$. For a particular building 102A, if the first source estimate is found to be consistent with a calculated value, $Y_1$, from the first regression model for the $S_1$ values for building 102A, then the original estimate was likely correct. If, however, a building 102A has big discrepancy between source-reported number and $Y_1$ value based on $S_1$ values, then, in one or more embodiments, a further comparison can be made. For example, a second calculated estimate $Y_2$ can be made based on the second regression model and values for second explanatory variables, $S_2$. The concept behind this approach is that, if the number is consistent with other numbers from different data sources, then it is considered as more likely to be correct.

In one or more embodiments, data can be collected from areas surrounding the location of the targeted building 102A. This neighborhood information can include information are available for all buildings and can include, for example, the number of mobility users, the occupancy of buildings in the area as estimated by the first source or the second source, the number of landline or other work telephones, the number of external living units in the area, and/or the number of cell towers in the area. Each of these summations can be referenced to a radius surrounding the targeted building. Exemplary radii of 100 m, 200 m and 400 m, respectively, can be used for collecting and categorizing the data. In one embodiment, the collected variables are indirectly related to occupancy. These measurements have some degree of uncertainty due to data measurement technologies, data collection technologies, data sample techniques, and other data quality issues. However, when collected and aggregated around the target building 102A, the measure data can be used to calculate occupancy estimates with useful accuracy and predictable results.

Figure 2:
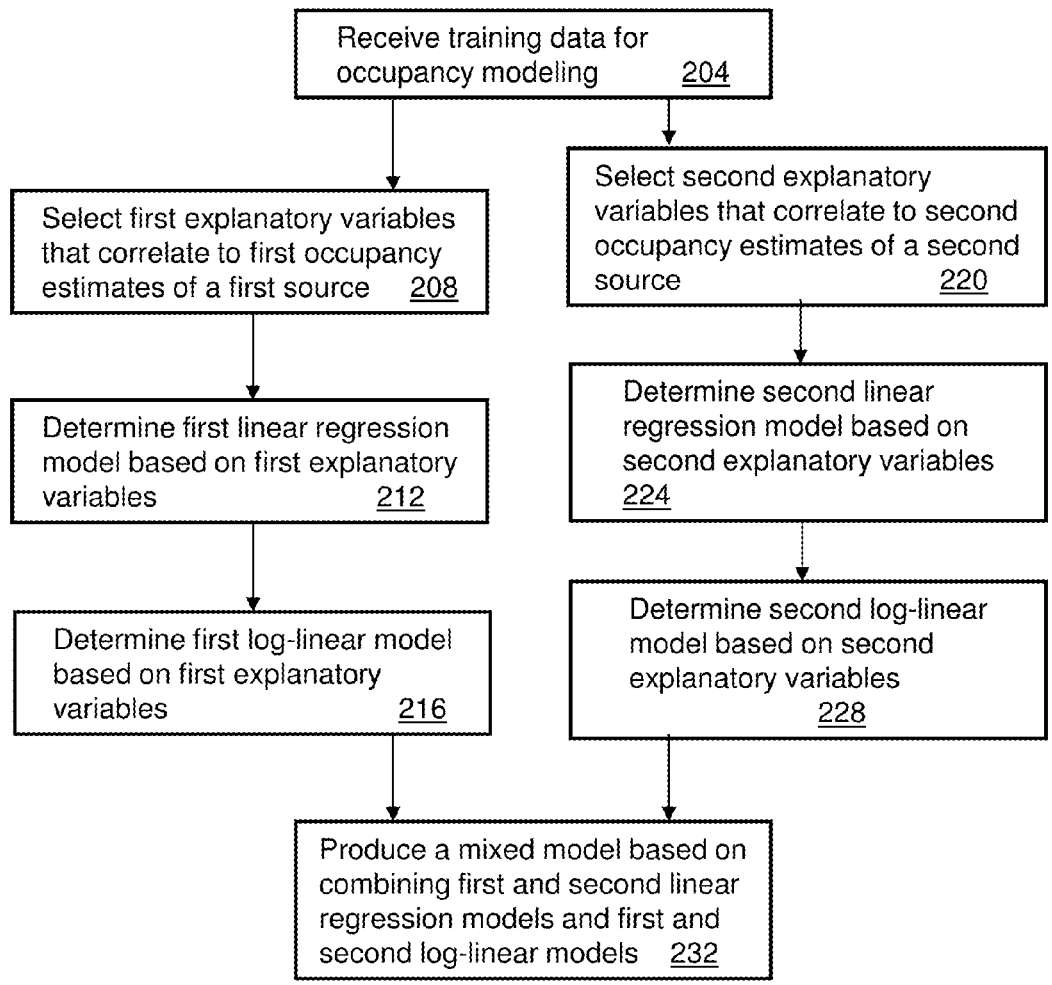
FIGS. 2 and 3 depict illustrative embodiments of methods operating in portions of the system described in FIG. 1.
Figure 3:
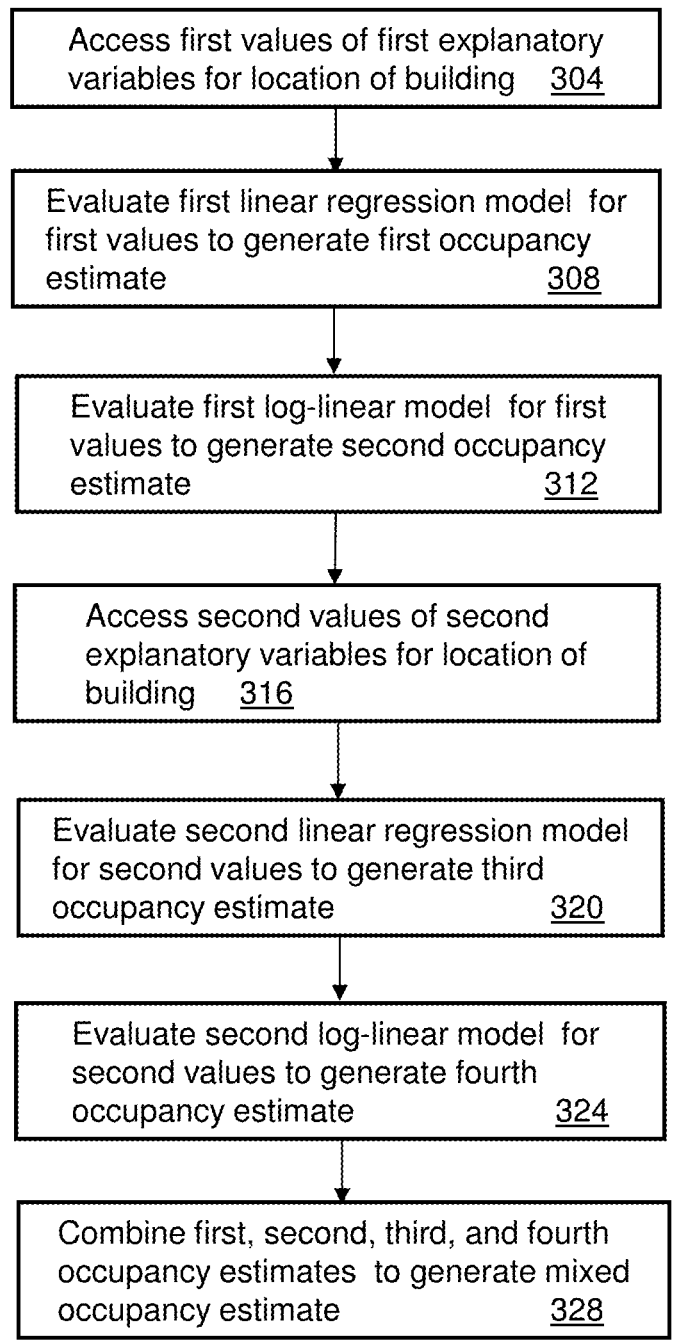

FIGS. 2 and 3 depict illustrative embodiments of methods operating in portions of the system described in FIG. 1. Beginning at step 204, the server 130 can receive training data for occupancy modeling. In one or more embodiments, the training data can include information for the locations of buildings 102A-B, landline telephones 109A-C, mobile devices 116A-C, and/or cellular towers 117A-C. The set of data can further include information regarding external living units in buildings and information on types of mobile devices. In one or more embodiments, the set of data can include estimated occupancies for buildings 102A-C from one or more estimation services. The training data can further include summations of data variables according to distances from particular buildings.

In step 208, the server 130 can select first explanatory variables from the training data, where the first explanatory variables correlate with occupancy estimates from a first estimating source. In step 212, the server 130 can determine a first linear regression model for the first explanatory variables. In step 216, the server 130 can determine a first log-linear regression model for the first explanatory variables. In one or more embodiments, the server 130 can analyze the training data to determine which of the potentially relevant variables is actually predictive of building occupancy. In one embodiment, an estimated building occupancy values for each building 102A in the training set (from the first source) are used as outputs in linear regression analysis. In one or more embodiments, the linear regression analysis can use the input data (sums of mobile devices in radii, etc.) and output data (estimated occupancy) for a group of buildings 102A-C. As a result of the regression analysis, a first linear regression model can be generated and variables that correlate well with building occupancy can be selected as a group of first explanatory variables, while excluding other variables. In one or more embodiments, a first log-linear model can similarly be derived from the first set of explanatory variables.

In similar fashion as in steps 208-216, in steps 220-228, the server 130 can select second explanatory variables from the training data, where the second explanatory variables correlate with occupancy estimates from a second estimating source, determine a second linear regression model for the first explanatory variables, and determine a second log-linear regression model for the second explanatory variables. In step 232, the server can produce a mixed model based on a combination of the first and second linear regression models and the first and second log-linear models.

After the occupancy models are determined, the models can be used to determine occupancy estimates of buildings. In step 304, the server 130 can access values for the first explanatory variables associated with a particular building. These values can be evaluated in steps 308 and 312 to generate first and second occupancy estimates for a target building. In one or more embodiments, the areas 141-143 surrounding a target building 102A can be evaluated to determine values for first explanatory variables corresponding to the first linear and log-linear models. In steps 316, 320, and 324, the server can similarly access second explanatory variables in the areas 141-143 surrounding the building 102A, and the values of these second explanatory variables can be used to evaluate the second linear and log-linear models. In step 328, the server 130 can combine the calculated values for the first and second linear regression and log-linear models and to generate a mixed occupancy estimate.

Example

A training set of data was collected for a group of buildings. The training set is illustrated, below, in Table 1. Neighborhood information is included, available for all buildings and further includes the number of mobility users, the occupancy of buildings in the area as estimated by the first source or the second source, the number of landline or other work telephones, the number of external living units in the area, and/or the number of cell towers in the area. Each of these summations can be referenced to a radius surrounding the targeted building. Exemplary radii of 100 m, 200 m and 400 m, respectively, can be used for collecting and categorizing the data.

TABLE 1

Training Group Variable Definitions

| Name | Description |
|---|---|
| First OCC | Building Occupancy from First Source |
| First WTN | Number of work telephones from Building |
| First ELU | Number of External Living Unit in Building |
| $OCC_{100}$, $OCC_{200}$, $OCC_{400}$ | Sum of Building Occupancy in 100 m, 200 m, 400 m |
| $WTN_{100}$, $WTN_{200}$, $WTN_{400}$ | Sum of Working Telephone in 100 m, 200 m, 400 m |
| $ELU_{100}$, $ELU_{200}$, $ELU_{400}$ | Sum of Ext. Living Units in 100 m, 200 m, 400 m |
| $CIQ_{100}$, $CIQ_{200}$, $CIQ_{400}$ | Sum of Specific Type Mobiles in 100 m, 200 m, 400 m |
| $AGPS_{100}$, $AGPS_{200}$, $AGPS_{400}$ | Sum of Mobiles in 100 m, 200 m, 400 m by AGPS |
| $NAGPS_{100}$, $NAGPS_{200}$, $NAGPS_{400}$ | Sum of Mobiles in 100 m, 200 m, 400 m by Cell Tower Triangulation |
| $USID_{100}$, $USID_{200}$, $USID_{400}$ | Sum of Cell Towers in 100 m, 200 m, 400 m |
| Second OCC | Building Occupancy from Second Source (other source) |

A training data group was identified that was believed to be the most likely to represent correct. Both the first estimating source and the second estimating source were recognized as having some degree of uncertainties due to different mechanisms for estimation. Building estimates that were believed to be the most accurate were retained in the training group, while inaccurate or implausible estimates were excluded. The training group data was selected to constrain the discrepancies between occupancy estimates from the first source and the second source under a threshold, T.

Data for a total of 134 buildings was collected for the analysis. The collected data was plotted on scatter plots (not shown) to assess the correlation of data from a visual perspective. Where the data exhibited a big discrepancy between the first and second sources for the same measurement, this data was excluded. The resulting training group data exhibited reasonable correlation between occupancy estimates from the first and second sources. Regression analysis as applied to the training group data for the first source estimates to identify a set of first explanatory variables $S_1$ and to construct a first linear regression model. The regression analysis was repeated on the training group data for the second source estimates to identify a set of second explanatory variables $S_2$ and to construct a second linear regression model. The first and second explanatory variable sets $S_1$ and $S_2$ were used to cross-validate the first source occupancy estimates and to estimate building occupancy where the first source occupancy estimate is inconsistent with other measurements.

The regression analysis exhaustively searched for a combination of explanatory variables for a response variable representing the first source occupancy estimates and thereby generated the first explanatory variables $S_1$. The analysis yielded a list of correlated variables as shown in Table 2. Generally, the greater the number of explanatory variables, the stronger the predictive power of the linear model. Linear models with four explanatory variables and five explanatory variables were compared for correlation, and it was determined that the additional benefit of a fifth explanatory variable was insignificant (changing the adjusted R-squared valued from 0.82 to 0.83). Therefore, the first linear regression model was chosen with four explanatory variables, where $S_1$=(NAGPS$_{100}$, NAGPS$_{200}$, CIQ$_{100}$, OCC$_{200}$).

TABLE 2

Variables correlated to First Source Occupancy Estimates

| Explanatory variable | Adjusted R-Squared |
|---|---|
| ELU$_{100}$ | 0.63 |
| CIQ$_{100}$, OCC$_{200}$ | 0.79 |
| NAGPS$_{100}$, NAGPS$_{200}$, CIQ$_{100}$, OCC$_{200}$ | 0.82 |
| NAGPS$_{400}$, CIQ$_{100}$, CIQ$_{200}$, OCC$_{100}$, OCC$_{200}$ | 0.83 |

The occupancy estimates from the second source were then used to cross validate the occupancy estimates from the first source. In this case, the occupancy information from the second source is far more limited when compared to the first source. Regression analysis of the data from the first source identified the explanatory variables that can be used to estimate building occupancy and cross validate the occupancy from the first source. A linear exclusive model was used to generate the list of correlated variables in Table 3. Again, the linear model with four variables was chosen for the second source occupancy estimation, where $S_2$= (AGPS$_{200}$, AGPS$_{400}$, CIQ$_{100}$, OCC$_{200}$). The second source model can be used to estimate the occupancy. The average of the first source model and the second source model can be used as an averaged occupancy estimate.

TABLE 3

Variables correlated to Second Source Occupancy Estimates

| Explanatory variable | Adjusted R-Squared |
|---|---|
| OCC$_{400}$ | 0.68 |
| ELU, CIQ$_{100}$, OCC$_{200}$ | 0.80 |
| AGPS$_{200}$, AGPS$_{400}$, CIQ$_{100}$, OCC$_{200}$ | 0.82 |
| AGPS$_{400}$, AGPS$_{400}$, CIQ$_{100}$, OCC$_{100}$, OCC$_{200}$ | 0.83 |

The mixed model was evaluated for the first and second linear regression models and log-linear models and resulted in excellent correlation. The first linear model resulted in in a training R-Square error of 0.84 and a validation R-Square error of 0.73. The second linear model resulted in in a training R-Square error of 0.81 and a validation R-Square error of 0.70. The mixed model resulted in in a training R-Square error of 0.86 and a validation R-Square error of 0.76.

Figure 4:
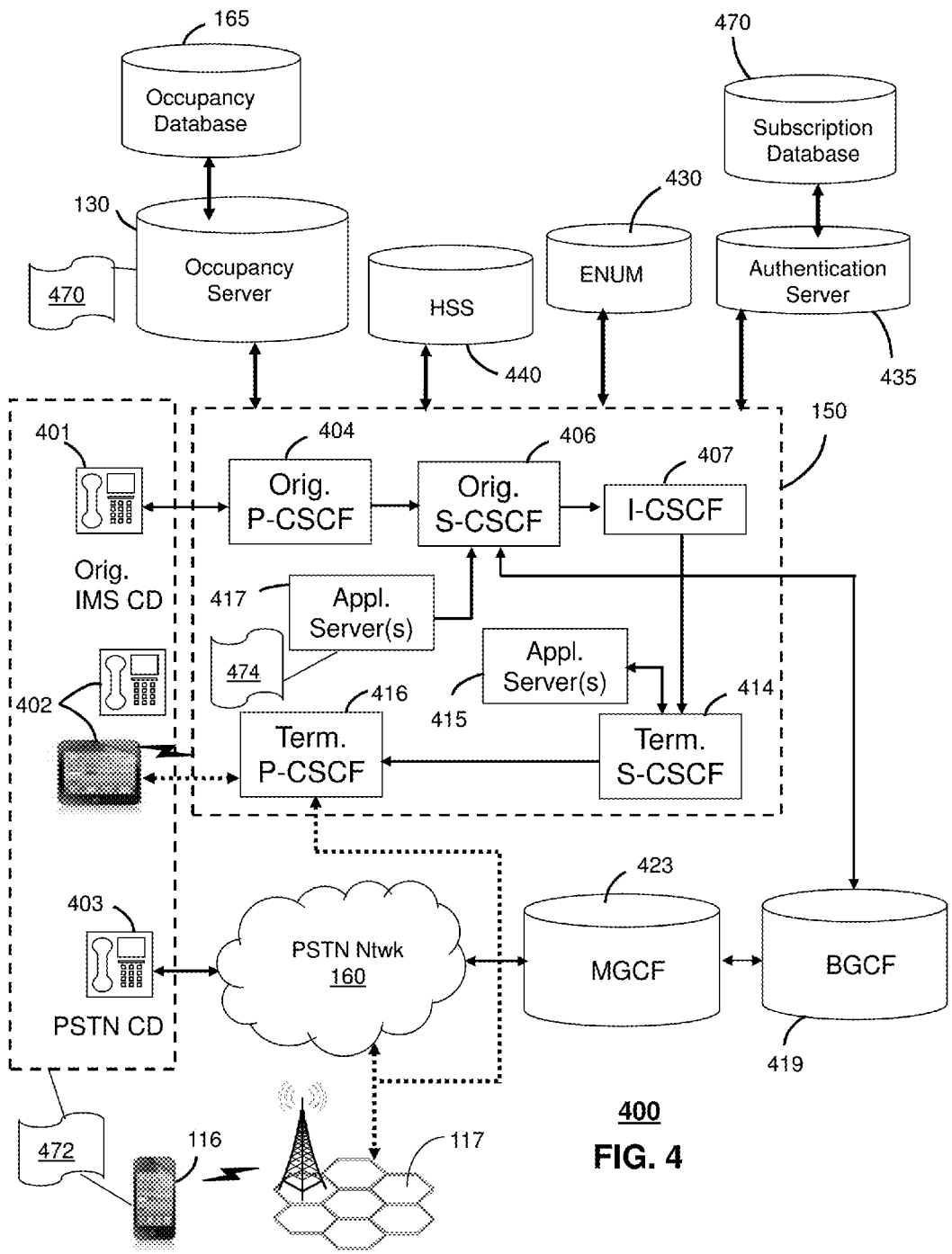
FIG. 4 depicts illustrative embodiments of a communication system for tracking mobile devices present in a location near a building according to embodiments illustrated in FIGS. 1-3.

FIG. 4 depicts an illustrative embodiment of a communication system 400 employing IP Multimedia Subsystem (IMS) network architecture to facilitate the combined services of circuit-switched and packet-switched systems. Communication system 400 can be overlaid or operably coupled with the system of FIG. 1 as another representative embodiment of the communication systems 100. In one embodiment, the system 400 can include a server 130 that can receive data associated with locations of buildings 102A-B, landline telephones 109A-C, mobile devices 116A-C, and/or cellular towers 117A-C. The server 130 can use the information to determine estimates for occupancy at one or more buildings 102A-C.

Communication system 400 can comprise a Home Subscriber Server (HSS) 440, a tElephone NUmber Mapping (ENUM) server 430, and other network elements of an IMS network 150. The IMS network 150 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 150 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 100 of FIG. 1.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 117, a femtocell, a WiFi router, a Digital Enhanced Cordless Telecommunications (DECT) base unit, or another suitable wireless access unit to establish communications with the IMS network 150 of FIG. 4. The cellular access base station 117 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 117 may communicate directly with the IMS network 150 as shown by the arrow connecting the cellular base station 117 and the P-CSCF 416.

It is further understood that alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The occupancy server 130 of FIG. 4 can be operably coupled to the second communication system 400 for purposes similar to those described above. Server 130 can perform function 470 and thereby provide media services to the CDs 401, 402, 403 and 405 of FIG. 4. CDs 401, 402, 403 and 405, which can be adapted with software to perform function 472, for modeling and predicting building occupancy, to utilize the services of the server 130. Server 130 can be an integral part of the application server(s) 417 performing function 474, which can be substantially similar to function 472 and adapted to the operations of the IMS network 150.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
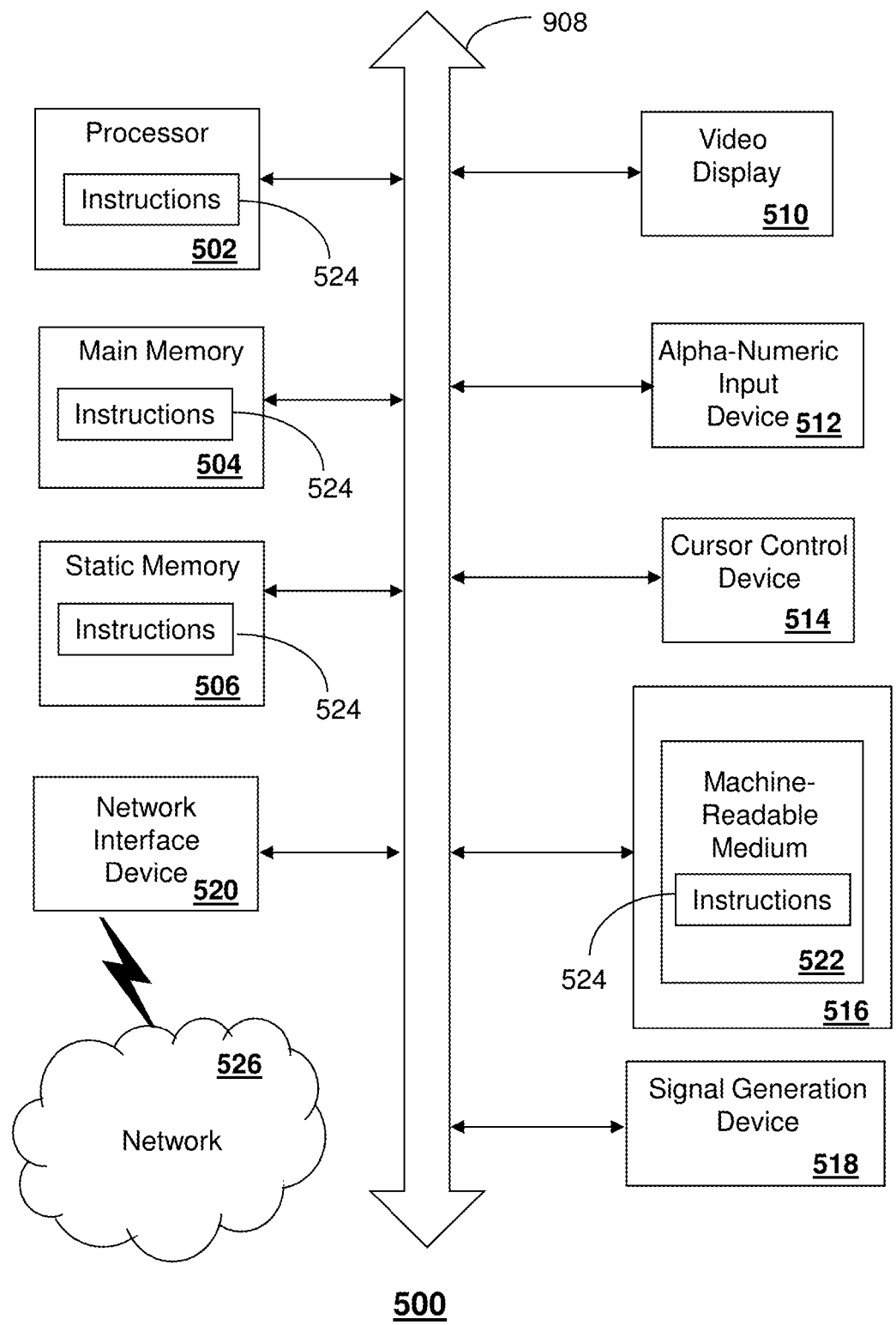
FIG. 5 is a diagrammatic representation of a machine in the form of a computer system within which a set of instructions, when executed, may cause the machine to perform any one or more of the methods discussed herein.

FIG. 5 depicts an exemplary diagrammatic representation of a machine or controller circuit in the form of a computer system 500 within which a set of instructions, when executed, may cause the machine to perform any one or more of the methods discussed above. One or more instances of the machine can operate, for example, as the server 130 as described above. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA) are contemplated for use by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as separately claimed subject matter.

What is claimed is:

1. A server comprising:
a processing system including a processor; and
a memory that stores executable instructions that, when executed by the processing system, facilitate performance of operations, comprising:
receiving a request over a network for an occupancy estimate for a building;
receiving a plurality of wireless signals associated with a plurality of mobile communication devices at a plurality of wireless communication structures at a plurality of locations, wherein the plurality of wireless communication structures includes a plurality of local cell towers;
calculating a plurality of signal strength measurements based on the plurality of wireless signals associated with the plurality of mobile communication devices;
determining a plurality of cell phone locations associated with the plurality of mobile communication devices via triangulating of the plurality of signal strength measurements and the plurality of locations;
determining presence information associated with the plurality of cell phone locations according to the plurality of cell phone locations and a location of the building;
determining first values for first explanatory variables associated with the location of the building according to the presence information associated with the plurality of cell phone locations, wherein the first explanatory variables are predictive of first reported occupancy estimates of a first occupancy estimating source;
evaluating a first occupancy model according to the first values to generate a first occupancy estimate for the building;

evaluating a second occupancy model according to the first values to generate a second occupancy estimate for the building;

accessing second values for second explanatory variables associated with the location of the building, wherein the second explanatory variables are predictive of second reported occupancy estimates of a second occupancy estimating source;

evaluating a third occupancy model according to the second values to generate a third occupancy estimate for the building;

evaluating a fourth occupancy model according to the second values to generate a fourth occupancy estimate for the building;

statistically combining the first occupancy estimate, the second occupancy estimate, the third occupancy estimate, and the fourth occupancy estimate to generate a mixed occupancy estimate;

reporting the mixed occupancy estimate over the network; and adjusting wireless communication bandwidth provided to the building by the plurality of wireless communication structures according to the mixed occupancy estimate.

2. The server of claim 1, wherein the first occupancy model is derived based on a first linear regression according to a first set of values of the first explanatory variables and wherein the third occupancy model is derived based on a second linear regression according to a second set of values the second explanatory variables.

3. The server of claim 2, wherein the first values comprise the plurality of mobile communication devices associated with the location of the building.

4. The server of claim 2, wherein the third occupancy model is derived based on a log-linear statistical analysis according to the first set of values of the first explanatory variables and wherein the fourth occupancy model is derived based on a log-linear statistical analysis according to the second set of values of the first explanatory variables.

5. The server of claim 1, wherein the processor further performs operations comprising:

selecting the first values of the first explanatory variables according to first distances of the first explanatory variables from the location of the building; and selecting the second values of the second explanatory variables according to second distances of the second explanatory variables from the location of the building.

6. The server of claim 5, wherein the first distances and the second distances comprise ranges of distances from the location of the building.

7. The server of claim 1, wherein the first values comprise a total number of mobile cellular towers associated with the location of the building.

8. The server of claim 1, wherein one of the first explanatory variables and one of the second explanatory variables are a same explanatory variable.

9. The server of claim 1, wherein the processor further performs operations comprising determining a communication processing bandwidth requirements according to the mixed occupancy estimate.

10. The server of claim 1, wherein the processor further performs operation comprising:

accessing a plurality of explanatory variables associated with occupancy; and analyzing the plurality of explanatory variables and a first plurality of occupancy estimates associated with the first occupancy estimating source to determine the first explanatory variables that are correlated to the first plurality of occupancy estimates.

11. The server of claim 10, wherein the processor further performs operation comprising analyzing the plurality of explanatory variables and a second plurality of occupancy estimates associated with the second occupancy estimating source to determine the second explanatory variables that are correlated to the second plurality of occupancy estimates.

12. The server of claim 1, wherein the processor further performs operations comprising comparing the mixed occupancy estimate to a third occupancy estimating source to cross-validate the third occupancy estimating source.

13. A method, comprising:

receiving, by a processing system comprising a processor, a plurality of wireless signals associated with a plurality of mobile communication devices at a plurality of wireless communication structures at a plurality of locations, wherein the plurality of wireless communication structures includes a plurality of local cell towers;

calculating a plurality of signal strength measurements based on the plurality of wireless signals associated with the plurality of mobile communication devices;

determining, by the processing system, a plurality of cell phone locations associated with the plurality of mobile communication devices via triangulating of the plurality of signal strength measurements and the plurality of locations;

determining, by the processing system, presence information associated with the plurality of cell phone locations according to the plurality of cell phone locations and a location of a building;

determining, by the processing system, first values for first explanatory variables associated with the location of the building according to the presence information associated with the plurality of cell phone locations, wherein the first explanatory variables are predictive of first reported occupancy estimates of a first occupancy estimating source;

evaluating, by the processing system, a first occupancy model according to the first values to generate a first occupancy estimate for the building;

evaluating, by the processing system, a second occupancy model according to the first values to generate a second occupancy estimate for the building;

statistically combining, by the processing system, the first occupancy estimate, the second occupancy estimate, a third occupancy estimate, and a fourth occupancy estimate to generate a mixed occupancy estimate;

reporting, by the processing system, the mixed occupancy estimate over a network; and adjusting wireless communication bandwidth provided to the building by the plurality of wireless communication structures according to the mixed occupancy estimate.

14. The method of claim 13, wherein the first values comprise the mobile plurality of communication devices associated with the location of the building.

15. The method of claim 13, further comprising:

accessing, by the processing system, second values for second explanatory variables associated with the location of the building, wherein the second explanatory variables are predictive of second reported occupancy estimates of a second occupancy estimating source;

evaluating, by the processing system, a third occupancy model according to second values to generate a third occupancy estimate for the building; and evaluating, by the processing system, a fourth occupancy model according to the second values to generate a fourth occupancy estimate for the building.

16. The method of claim 15, wherein the first occupancy model is derived based on a first linear regression according to a first set of values of the first explanatory variables and wherein the third occupancy model is derived based on a second linear regression according to a second set of values the second explanatory variables.

17. The method of claim 16, comprising:
selecting, by the processing system, the first values of the first explanatory variables according to first distances of the first explanatory variables from the location of the building; and
selecting, by the processing system, the second values of the second explanatory variables according to second distances of the second explanatory variables from the location of the building.

18. The method of claim 16, wherein the third occupancy model is derived based on a log-linear statistical analysis according to the first set of values of the first explanatory variables and wherein the fourth occupancy model is derived based on a log-linear statistical analysis according to the second set of values of the first explanatory variables.

19. A non-transitory machine-readable storage medium, comprising executable instructions that, when executed by a processing system including a processor, facilitate performance of operations, comprising:
receiving, a plurality of wireless signals associated with a plurality of mobile communication devices at a plurality of wireless communication structures at a plurality of locations, wherein the plurality of wireless communication structures includes a plurality of local cell towers;
calculating a plurality of signal strength measurements based on the plurality of wireless signals associated with the plurality of mobile communication devices;
determining a plurality of cell phone locations associated with the plurality of mobile communication devices via triangulating of the plurality of signal strength measurements and the plurality of locations;
determining presence information associated with the plurality of cell phone locations according to the plurality of cell phone locations and a location of a building;
determining first values for first explanatory variables associated with the location of the building according to the presence information associated with the plurality of cell phone locations, wherein the first explanatory variables are predictive of first reported occupancy estimates of a first occupancy estimating source;
evaluating a first occupancy model according to the first values to generate a first occupancy estimate for the building;
statistically combining the first occupancy estimate, a second occupancy estimate, a third occupancy estimate, and a fourth occupancy estimate to generate a mixed occupancy estimate; and
adjusting wireless communication bandwidth provided to the building by the plurality of wireless communication structures according to the mixed occupancy estimate.

20. The non-transitory machine-readable storage medium of claim 19, wherein the operations further comprise:
accessing second values for second explanatory variables associated with the location of the building, wherein the second explanatory variables are predictive of second reported occupancy estimates of a second occupancy estimating source;
evaluating a third occupancy model according to second values to generate a third occupancy estimate for the building; and
evaluating a fourth occupancy model according to the second values to generate a fourth occupancy estimate for the building.

* * * * *